(12) United States Patent
Wu et al.

(10) Patent No.: US 8,951,214 B2
(45) Date of Patent: Feb. 10, 2015

(54) BATTERY PACK WITH MASSAGE FUNCTION

(75) Inventors: Jing-Tang Wu, New Taipei (TW); Tsung-Ying Tsai, New Taipei (TW)

(73) Assignee: Wistron Corporation, New Taipei (TW)

( * ) Notice: Subject to any disclaimer, the term of this patent is extended or adjusted under 35 U.S.C. 154(b) by 378 days.

(21) Appl. No.: 13/243,766

(22) Filed: Sep. 23, 2011

(65) Prior Publication Data

US 2013/0035618 A1 Feb. 7, 2013

(30) Foreign Application Priority Data

Aug. 3, 2011 (TW) ............... 100127650 A

(51) Int. Cl.
*A61H 1/00* (2006.01)
*A61H 7/00* (2006.01)
*A61H 23/00* (2006.01)
*A61H 23/02* (2006.01)
*H01M 2/10* (2006.01)

(52) U.S. Cl.
CPC .................. *H01M 2/1055* (2013.01)
USPC .............. 601/46; 601/97; 601/101; 601/107; 601/108

(58) Field of Classification Search
CPC ... A61H 23/00; A61H 23/004; A61H 23/006; A61H 23/008; A61H 23/02; A61H 23/0254; A61H 23/0263; A61H 23/06; A61H 2023/002; A61H 23/0272; A61H 23/0281; A61H 39/00; A61H 39/07; A61H 39/04; A61H 2201/12; A61H 2201/1207; A61H 2201/1215; A61H 2201/1418; A61H 2201/1427
USPC .......... 601/46, 67, 69–72, 79, 101, 103, 107, 601/108, 111, 89, 93, 95, 97; D24/214, D24/215, 211; 320/112; 429/96–100
See application file for complete search history.

(56) References Cited

U.S. PATENT DOCUMENTS 3,603,783 A * 9/1971 Schwartz ...................... 362/188
4,682,771 A * 7/1987 Jean ................................ 482/57
6,228,103 B1 5/2001 Grey et al.

(Continued)

FOREIGN PATENT DOCUMENTS

TW M324817 1/2008
TW M396995 1/2011

*Primary Examiner* — Justine Yu
*Assistant Examiner* — Michael Tsai
(74) *Attorney, Agent, or Firm* — Muncy, Geissler, Olds & Lowe, P.C.

(57) ABSTRACT

A battery pack with massage function includes a case, a battery cell, an electrical connector, a switch, a moving body, and an electrical actuator assembly. The case has an accommodation space and a through hole communicating the accommodation space. The battery cell is disposed in the accommodation space. The electrical connector is disposed on a surface of the case and is electrically connected to the battery cell. The electrical connector is used for connecting with an electrical receiver of an electronic device for supplying electrical power from the battery cell to the electronic device. The switch is electrically connected to the battery cell to be selectively switched to a close-circuit-state or an open-circuit-state. The moving body is capable of moving reciprocally via the through hole. The electrical actuator assembly is connected to the battery pack via the switch to generate a driving force to move the moving body reciprocally.

10 Claims, 5 Drawing Sheets

(56) References Cited

U.S. PATENT DOCUMENTS

| | | | |
|---|---|---|---|
| 6,582,449 B2* | 6/2003 | Grey et al. | 606/204 |
| 7,223,250 B2* | 5/2007 | Brattesani et al. | 601/46 |
| 2003/0158505 A1* | 8/2003 | Calvert | 601/110 |
| 2006/0155224 A1* | 7/2006 | Calvert | 601/111 |
| 2008/0161734 A1* | 7/2008 | Blockton | 601/70 |
| 2008/0262397 A1* | 10/2008 | Habatjou | 601/93 |

* cited by examiner

BATTERY PACK WITH MASSAGE FUNCTION

CROSS-REFERENCES TO RELATED APPLICATIONS

This non-provisional application claims priority under 35 U.S.C. §119(a) on Patent Application No. 100127650 filed in Taiwan, R.O.C. on 2011/8/3, the entire contents of which are hereby incorporated by reference.

BACKGROUND OF THE INVENTION

1. Technical Field

This disclosure relates to a battery pack for a portable electronic device, and more particularly to a battery pack with massage function.

2. Related Art

A typical electric massage device is a combination of a motor and a drive part, the motor and the drive part drive one or more massage blocks to move reciprocally, so as to massage a particular part of a user. Such an electric massage device is sometimes manufactured as an independent apparatus, and is sometimes combined with other electronic devices. For example, Taiwan (R.O.C.) Utility Model No. M324817 disclosed a computer mouse, in which an electric motor, a drive part, and a massage cushion are disposed in the computer mouse. Powered by the computer mouse, the electric motor and the drive part drive the massage cushion to vibrate, so that massage bumps on the massage cushion vibrate reciprocally, thereby massaging a palm of the user.

For a wireless computer mouse, capacitance of a built-in battery is limited, and the electrical power is quickly consumed when being used to drive the electric motor, the drive part, and the massage cushion to provide the massage function. When the technology in M324817 is implemented by using a wired computer mouse, a mouse cable causes interference when the massage function is performed. In addition, the mouse cable has to be connected with a computer in a normal operation mode to get the electrical power for the massage function.

Taiwan (R.O.C.) Utility Model No. M396995 discloses a laptop computer, in which a component providing a massage function is disposed in a Palm-Rest of the laptop computer. Like normally operating the laptop computer, the user puts palms on the Palm-Rest to receive the massage of the massage component. In addition, as a battery of the laptop computer has a larger capacitance than that of a normal mouse, so the battery can normally supply power to the laptop computer after supporting the operation of the massage component for a short period of time. However, the laptop computer of M396995 is only suitable for massage of the palms, and it is hard to raise the laptop computer to massage other parts of the body of the user.

SUMMARY

In the prior art, a problem of power supply or a problem of a limited occasion for operation occurs in the combination of the massage device and the electronic device. This disclosure is directed to a battery pack with massage function, which has large capacitance and is convenient for operation, so that the user can use the battery pack to massage different parts of the body.

This disclosure provides a battery pack with massage function, for supplying electrical power to an electronic device and providing a massage function. The electronic device has an electrical receiver matching the battery pack. The battery pack includes a case, at least one battery cell, an electrical connector, a switch, at least one moving body, and an electrical actuator assembly.

The case has an accommodation space and at least one through hole communicating the accommodation space. The battery cell is disposed in the accommodation space and is used for supplying electrical power. The electrical connector is disposed on a surface of the case and is electrically connected to the battery cell. The electrical connector is used for connecting with the electrical receiver, so as to transmit the electrical power to the electronic device. The switch is electrically connected to the battery cell, and can be selectively switched to a close-circuit-state or an open-circuit-state. The moving body is located in the through hole for moving reciprocally via the through hole. The electrical actuator assembly is electrically connected to the battery cell through the switch, and obtains the electrical power from the battery cell to generate a driving force when the switch is switched to the close-circuit-state, so as to push the moving body to move reciprocally.

The battery pack with massage function is capable to be detached from the electronic device when the electronic device is required to be operated, and the massage function is started by switching the switch. Therefore, the battery pack of this disclosure has a function of supplying electrical power and the massage function. The detached battery pack can be moved at will, so as to massage any part of the body. In addition, when the electrical power is supplied to the electronic device, it is ensured that the massage function is stopped by switching the switch, so as to avoid interference of the electrical power output to the electronic device.

BRIEF DESCRIPTION OF THE DRAWINGS

This disclosure will become more fully understood from the detailed description given herein below for illustration only, and thus are not limitative of this disclosure, and wherein.

DETAILED DESCRIPTION

Figure 1:
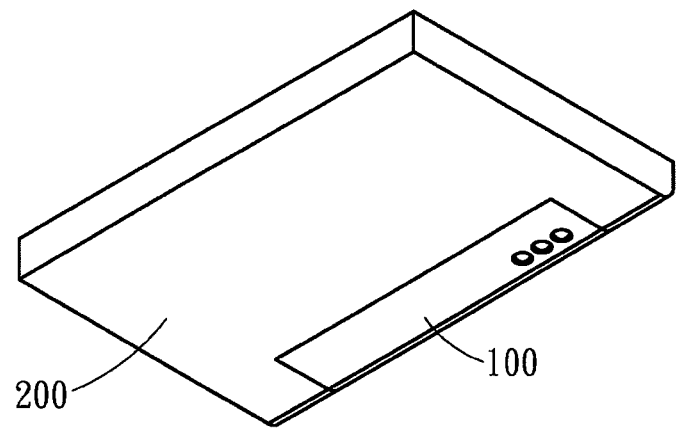
FIG. 1 is a perspective view of a battery pack and an electronic device according to a first embodiment of this disclosure, in which the battery pack is combined with the electronic device.
Figure 2:
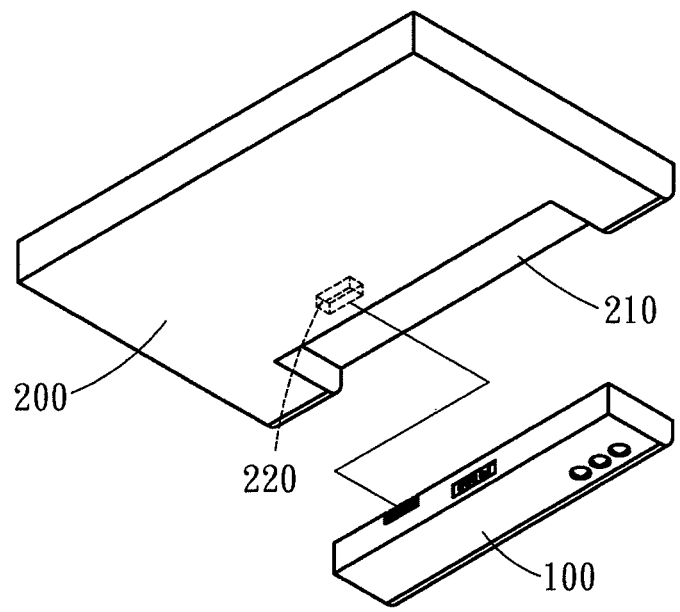
FIG. 2 is a perspective view of the battery pack and the electronic device according to the first embodiment of this disclosure, in which the battery pack is detached from the electronic device.

FIG. 1 and FIG. 2 show a battery pack 100 with a massage function according to a first embodiment of this disclosure, which is used for supplying electrical power to an electronic device 200.

As shown in FIG. 1 and FIG. 2, the electronic device 200 has a receiving portion 210 and an electrical receiver 220 matching the battery pack 100. The receiving portion 210 is a concave structure formed on a surface of the electronic device 200. The configuration of the receiving portion 210 at least matches a part of the battery pack 100, so as to assemble the part of the battery pack 100 into the receiving portion 210. As the part of the battery pack 100 is assembled into the receiving portion 210, the battery pack 100 is combined with the electronic device 200 through a fastening mechanism. The electrical receiver 220 is disposed at the receiving portion 210, and is electrically connected internal circuit of the electronic device 200. When the battery pack 100 is combined with the electronic device 200 and the electrical receiver 220 is electrically connected to the battery pack 100, the battery pack 100 supplies electrical power to the electronic device 200. The electronic device 200 may be, but is not limited to, a laptop computer, a flat panel computer, a portable navigation device, an electronic reader (an electronic book), or other portable electronic devices using a battery as a power source.

Figure 3:
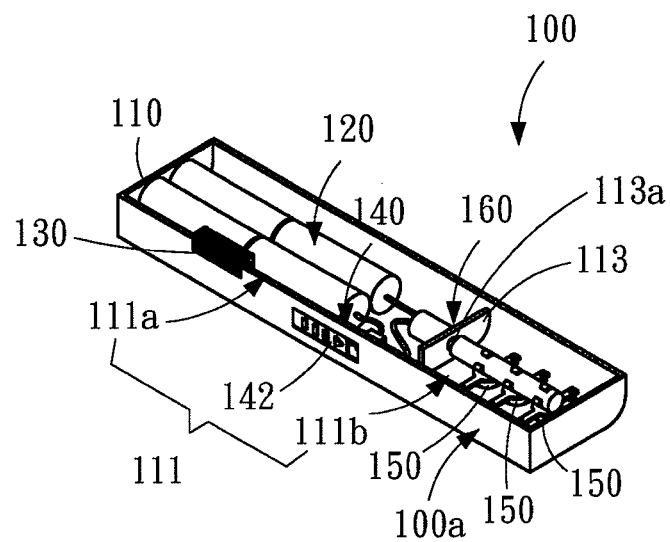
FIG. 3 is a perspective view of the battery pack according to the first embodiment of this disclosure, in which a case is presented by a partially cross-sectional view.
Figure 4:
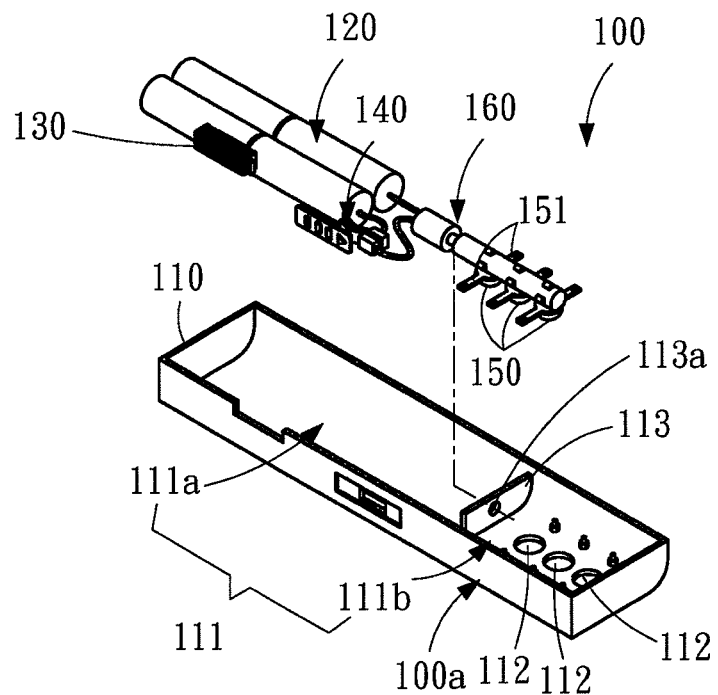
FIG. 4 is a perspective exploded view of the battery pack according to the first embodiment of this disclosure, in which the case is presented by a partially sectional view.

As shown in FIG. 2, FIG. 3, and FIG. 4, after being detached from the electronic device 200, the battery pack 100 is capable to provide a massage function. The battery pack 100 includes a case 110, one or more battery cells 120, an electrical connector 130, a switch 140, a plurality of moving bodies 150, and an electrical actuator assembly 160. In FIG. 3 and FIG. 4, the part of the case 110 is removed, so as to present an internal structure of the battery pack 100.

As shown in FIG. 3 and FIG. 4, the case 110 has an accommodation space 111. The case 110 has a plurality of through holes 112 communicating the accommodation space 111. The number of the through holes 112 is determined by the number of the moving bodies 150. The number of the moving bodies 150 may be one, while the case 110 only needs one through hole 112 to match the moving body 150.

As shown in FIG. 3 and FIG. 4, the battery cells 120 are disposed in the accommodation space 111 and are used for supplying electrical power. According to the requirement on voltage, the battery cells 120 may be connected with each other in parallel or in series optionally, so as to supply the required electrical power to the electrical actuator assembly 160.

As shown in FIG. 3 and FIG. 4, the electrical connector 130 is disposed on a surface of the case 110, and is electrically connected to the battery cells 120. The electrical connector 130 is used for connecting with the electrical receiver 220. When a part of the battery pack 100 is assembled in the receiving portion 210, the electrical connector 130 is connected with the electrical receiver 220 of the electronic device 200, so as to transmit the electrical power supplied by the battery cells 120 to the electronic device 200.

As shown in FIG. 3 and FIG. 4, the switch 140 is electrically connected to the battery cells 120 to be selectively switched to a close-circuit-state or an open-circuit-state.

As shown in FIG. 3 and FIG. 4, the moving bodies 150 are respectively located in one of the through holes 112 for moving reciprocally via in the through holes 112.

Figure 5:
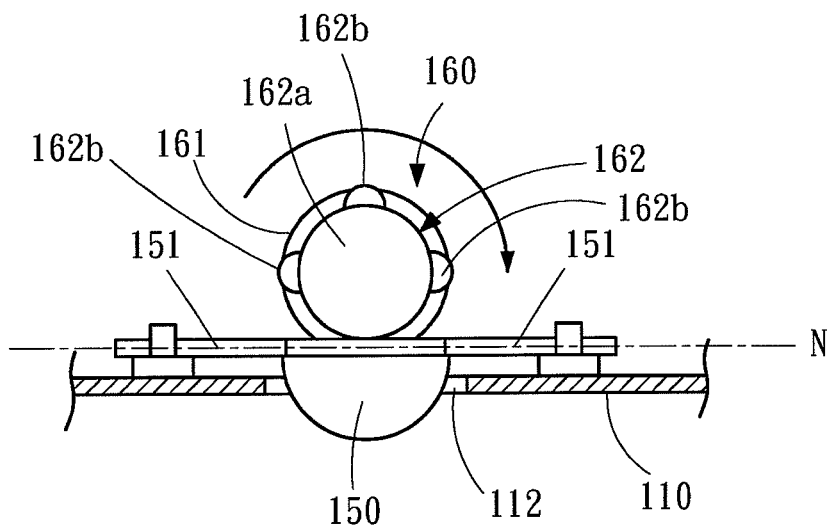
FIG. 5 and FIG. 6 are side views of the case, a motor, a drive part, and a moving body according to the first embodiment of this disclosure.
Figure 6:
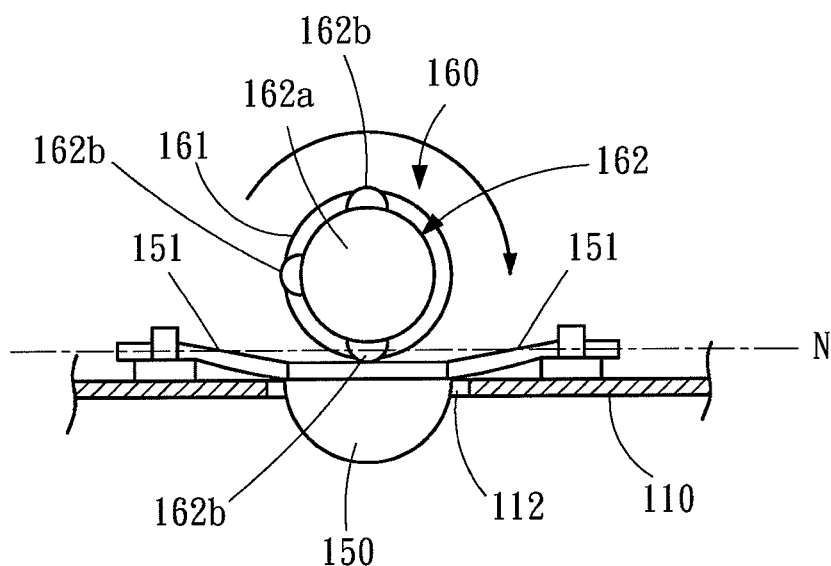

As shown in FIG. 5 and FIG. 6, the battery pack 100 further includes a plurality of elastic arms 151 for connecting the moving bodies 150 to the case 110. In an example, for each moving body 150, two elastic arms 151 are arranged for corporation and respectively extend from an edge of the moving body 150 towards an opposite direction. Each of the elastic arms 151 is used for movably fixing the moving body 150 to the case 110 and maintaining the moving body 150 at a normal position N in the through hole 112. When the moving body 150 is pushed to leave the normal position N, the elastic arm 151 also deforms to generate an elastic force, so as to drive the moving body 150 to return to the normal position N.

As shown in FIG. 3 and FIG. 4, the electrical actuator assembly 160 is electrically connected to the battery cells 120 through the switch 140, and obtains the electrical power from the battery cells 120 to generate a driving force when the switch 140 is switched to the close-circuit-state, so as to push the moving body 150 to move reciprocally.

Figure 7:
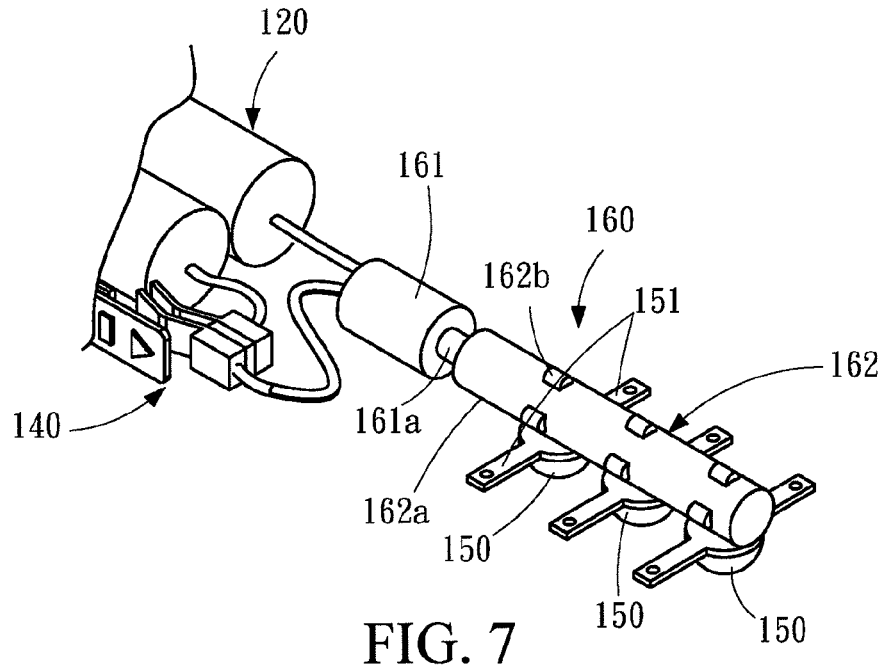
FIG. 7, FIG. 8, and FIG. 9 are magnified perspective views of some elements according to the first embodiment of this disclosure.

As shown in FIG. 5, FIG. 6, and FIG. 7, the electrical actuator assembly 160 includes a motor 161 and a drive part 162. The motor 161 has an output shaft 161a. The motor 161 is electrically connected to the battery cells 120 through the switch 140, and provides a rotary output through the output shaft 161a when obtaining the electrical power from the battery cells 120 via the switch 140.

As shown in FIG. 5, FIG. 6, and FIG. 7, the drive part 162 is connected with the motor 161 to be driven to rotate by the rotary output, so as to drive the moving body 150 to move reciprocally via the through hole 112.

Figure 8:
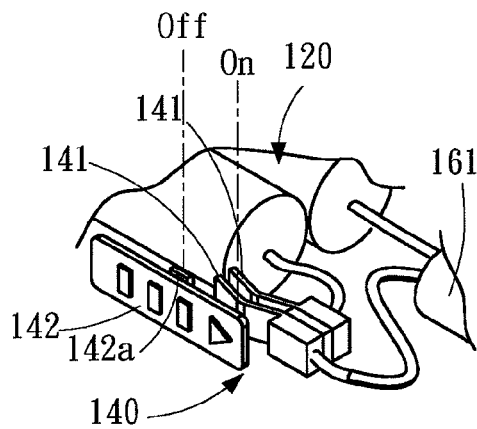
Figure 9:
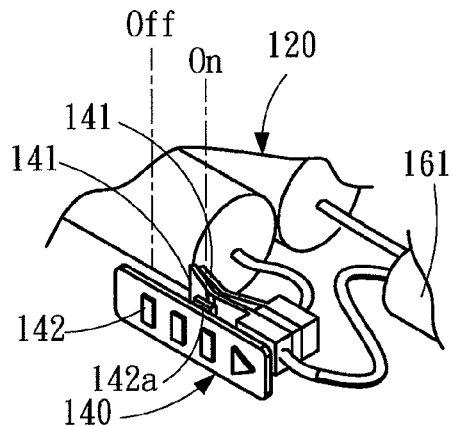

As shown in FIG. 4, FIG. 8, and FIG. 9, the switch 140 includes two conductive reeds 141 and a switching element 142. The conductive reeds 141 are disposed to the case 110 and located in the accommodation space 111. The two conductive reeds 141 are respectively electrically connected to the battery cells 120 and the motor 161, and normally maintain a non-contact-state. The switching element 142 is movably disposed on the surface of the case 110 to be moved to an On position and an Off position. The switching element 142 further includes an abutting part 142a extending to the case 110. When the switching element 142 is at the On position, the abutting part 142a presses at least one of the two conductive reeds 141 to enable the two conductive reeds 141 to contact with each other, so that the battery cells 120 are electrically connected to the motor 161.

As shown in FIG. 3, in order to ensure that the motor 161 is started only when the battery pack 100 is detached from the electronic device 200, among a plurality of external planes 100a of the case 110, the electrical connector 130 has at least one part located at a same external plane 100a with the switching element 142. Therefore, when the battery pack 100 is assembled on the electronic device 200, the switching element 142 is hidden between the battery pack 100 and the electronic device 200, so as to prevent a user from contacting and starting the motor 161 by mistake, thereby maintaining the battery pack 100 to normally supply power to the electronic device 200.

As shown in FIG. 5, FIG. 6, and FIG. 7, in the first embodiment, the drive part 162 includes a shaft lever 162a and a plurality of actuating parts 162b. The shaft lever 162a is connected with the output shaft 161a of the motor 161, so as to be driven to rotate by the rotary output of the motor 161. The actuating parts 162b of the first embodiment are bumps respectively disposed on a surface of the shaft lever 162a, and are respectively disposed corresponding to the moving bodies 150. Each of the moving bodies 150 has at least one corresponding actuating part 162b.

As shown in FIG. 5 and FIG. 6, in terms of the relative position, the shaft lever 162a and the actuating parts 162b are located at an inner side, and the moving bodies 150 are located at an outer side. In terms of each of the actuating parts 162b, every time the shaft lever 162a rotates one cycle, the actuating part 162b is driven to rotate one cycle; and when arriving at the bottom of the moving body 150, the actuating part 162b pushes the moving body 150 to move outwards via the through hole 112. Therefore, with the rotation of the shaft lever 162a, each of the actuating parts 162b intermittently pushes the moving body 150 to move outwards via the through hole 112.

As shown in FIG. 3 and FIG. 4, the case 110 further includes a partition board 113. The partition board 113 is disposed in the accommodation space 111 and divides the accommodation space 111 into a first section 111a and a second section 111b. In addition, the partition board 113 has a shaft hole 113a. The battery cells 120 and the motor 161 are located at the first section 111a, and the shaft lever 162a and the actuating parts 162b are located at the second section 111b. The output shaft 161a of the motor 161 passes through the shaft hole 113a and is connected with the shaft lever 162a.

As shown in FIG. 1 and FIG. 2, when the electronic device 200 is not used, the battery pack 100 is detached to serve as a massage appliance.

As shown in FIG. 8 and FIG. 9, after the battery pack 100 is detached, the switching element 142 of the switch 140 is switched from the Off position to the On position, so as to electrically connect the motor 161 of the electrical actuator assembly with the battery cells 120 for obtaining power. As shown in FIG. 5 and FIG. 6, the motor 161 starts to provide a rotary output by an output of the output shaft 161a at this time. The shaft lever 162a is driven to rotate by the motor 161, so as to enable the actuating parts 162b to intermittently push the moving body 150 to move outwards via the through hole 112 with the rotation of the shaft lever 162a. Each of the moving bodies 150 intermittently moves to and fro in a vertical direction via the through hole 112, and the user can perform massage by placing the moving bodies 150 on a portion to be massaged such as the user's shoulder.

When it is required to stop massage, especially when it is required to install the battery pack 100 back to the electronic device 200, the switching element 142 of the switch 140 is switched from the On position to the Off position, so as to disconnect with the electrical connection between the motor 161 and the battery cells 120. As a result, all the power of the battery cells 120 is output through the electrical connector 130 for the operation of the electronic device 200.

The massage function is started by switching the switch 140, so that the battery pack 100 is equipped with a function of supplying electrical power and the massage function. With the switching of the switch 140, the functions individually operate without interfering with each other. The detached battery pack 100 can be moved to anywhere at will, so as to massage any part of the body. When the electrical power is supplied to the electronic device 200, it can be ensured that the massage function of the battery pack 100 is stopped by switching the switch, so as to avoid interference of the electrical power output to the electronic device 200.

Figure 10:
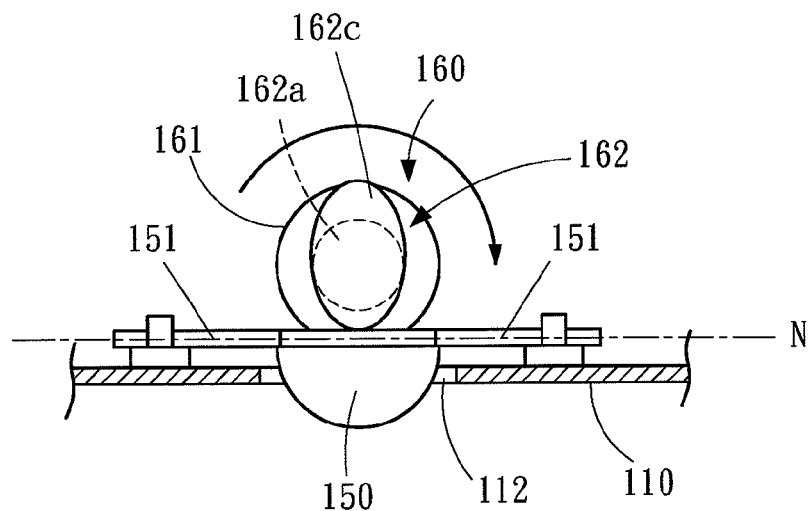
FIG. 10 and FIG. 11 are side views of a case, a motor, a drive part, and a moving body according to a second embodiment of this disclosure.
Figure 11:
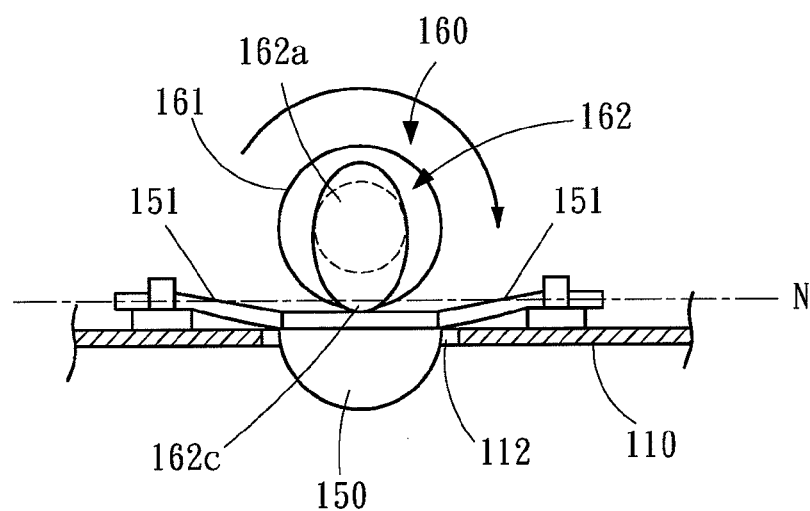

FIG. 10 and FIG. 11 show an actuating part 162c according to a second embodiment of this disclosure, which is used for replacing the actuating parts 162b in the first embodiment. The actuating part 162c of the second embodiment is a cam disposed at the shaft lever 162a. The cam at least has a convex curved surface for contacting a bottom of the moving body 150, so that the moving body 150 is pushed away from the normal position N and moves outwards via the through hole 112.

While this disclosure has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A battery pack with massage function, for supplying electrical power to an electronic device and providing a massage function, the electronic device having an electrical receiver matching the battery pack, the battery pack comprising:
    a case, having an accommodation space defined therein and at least one through hole communicating the accommodation space to an external plane of the case;
    at least one battery cell, disposed in the accommodation space, for supplying the electrical power;
    an electrical connector, disposed on a surface of the case, and electrically connected to the battery cell, wherein the electrical connector is used for connecting with the electrical receiver, so as to transmit the electrical power to the electronic device;
    a switch, electrically connected to the battery cell to be selectively switched to a close-circuit-state or an open-circuit-state;
    at least one moving body, located in the through hole for moving reciprocally via the through hole; and
    an electrical actuator assembly, electrically connected to the battery cell through the switch, for obtaining the electrical power from the battery cell when the switch is switched to the close-circuit-state, and generating a driving force to push the moving body to move reciprocally, wherein
    the battery pack is detachable from the electronic device to serve as a massage appliance.

2. The battery pack with massage function according to claim 1, wherein the electrical actuator assembly comprises:
    a motor, having an output shaft, wherein the motor is electrically connected to the battery cell through the switch, and provides a rotary output through the output shaft when obtaining the electrical power via the switch; and
    a drive part, connected with the output shaft of the motor to be driven to rotate by the rotary output, so as to drive the moving body to move reciprocally via the through hole.

3. The battery pack with massage function according to claim 2, wherein the drive part comprises:
    a shaft lever, connected with the output shaft of the motor, so as to be driven to rotate by the rotary output; and
    at least one actuating part, disposed at the shaft lever and corresponding to the moving body, wherein the actuating part intermittently pushes the moving body to move reciprocally via the through hole with rotation of the shaft lever.

4. The battery pack with massage function according to claim 3, wherein the actuating part is a bump disposed on a surface of the shaft lever.

5. The battery pack with massage function according to claim 4, further comprising at least one elastic arm, connecting the moving body to the case and providing an elastic force to drive the moving body to return to a normal position.

6. The battery pack with massage function according to claim 3, wherein the actuating part is a cam disposed at the shaft lever.

7. The battery pack with massage function according to claim 6, further comprising at least one elastic arm, connecting the moving body to the case and providing an elastic force to drive the moving body to return to a normal position.

8. The battery pack with massage function according to claim 3, wherein the case further comprises:
   a partition board, having a shaft hole, and disposed in the accommodation space, wherein the partition board divides the accommodation space into a first section and a second section, the battery cell and the motor are located at the first section, the shaft lever and the actuating part are located at the second section, and the output shaft of the motor passes through the shaft hole and is connected with the shaft lever.

9. The battery pack with massage function according to claim 2, wherein the switch comprises:
   two conductive reeds, disposed to the case and located in the accommodation space, wherein the two conductive reeds are respectively electrically connected to the battery cell and the motor, and normally maintain a non-contact-state; and
   a switching element, movably disposed on the surface of the case and capable of being moved to an On position and an Off position, wherein the switching element further comprises an abutting part extending into the accommodation space of the case, and when the switching element is at the On position, the abutting part at least presses one of the two conductive reeds to enable the two conductive reeds to contact with each other.

10. The battery pack with massage function according to claim 9, wherein the case has a plurality of external planes, and the electric connector has at least one part located at a same external plane with the switching element.

* * * * *